(12) United States Patent
Guo et al.

(10) Patent No.: US 10,025,760 B2
(45) Date of Patent: Jul. 17, 2018

(54) MAPPING PAGE STATES TO URLS

(71) Applicant: eBay Inc., San Jose, CA (US)

(72) Inventors: Kevin Guo, Shanghai (CN); Nikhil Dattakumar Sukhtankar, Fremont, CA (US)

(73) Assignee: eBay Inc., San Jose, CA (US)

( * ) Notice: Subject to any disclaimer, the term of this patent is extended or adjusted under 35 U.S.C. 154(b) by 155 days.

(21) Appl. No.: 13/782,840

(22) Filed: Mar. 1, 2013

(65) Prior Publication Data

US 2014/0215316 A1   Jul. 31, 2014

Related U.S. Application Data

(60) Provisional application No. 61/756,864, filed on Jan. 25, 2013.

(51) Int. Cl.
*G06F 17/00* (2006.01)
*G06F 17/22* (2006.01)
*G06F 17/30* (2006.01)

(52) U.S. Cl.
CPC .... *G06F 17/2247* (2013.01); *G06F 17/30876* (2013.01)

(58) Field of Classification Search
CPC .................. G06F 17/2247; G06F 17/30876
USPC .......... 715/206, 208, 204, 207, 241
See application file for complete search history.

(56) References Cited

U.S. PATENT DOCUMENTS

| | | |
|---|---|---|
| 5,347,484 A | 9/1994 | Kwong et al. |
| 6,049,812 A * | 4/2000 | Bertram ............ G06F 17/30899 707/999.01 |
| 7,949,991 B1 * | 5/2011 | Kuwamoto et al. .......... 717/100 |

| | | |
|---|---|---|
| 2009/0070392 A1 | 3/2009 | Le Roy et al. |
| 2009/0154245 A1 | 6/2009 | Shirakawa et al. |
| 2010/0322000 A1 | 12/2010 | Shim et al. |
| 2011/0055314 A1 | 3/2011 | Rosenstein et al. |

(Continued)

FOREIGN PATENT DOCUMENTS

| | | |
|---|---|---|
| CN | 1091281 C | 9/2002 |
| JP | 10207806 A | 8/1988 |

(Continued)

OTHER PUBLICATIONS

Tinywall, 'Change browser url without page reloading with Ajax request using JavaScript, HTML5 history API, jQuery, PHP like Facebook, Github navigation menu', Tinywall Infomedia, Feb. 22, 2012.*

(Continued)

*Primary Examiner* — Stephen Hong
*Assistant Examiner* — Matthew Ludwig
(74) *Attorney, Agent, or Firm* — Schwegman Lundberg & Woessner, P.A.

(57) ABSTRACT

A client application displaying a dynamically generated single page from a web application may display consistent and intuitive uniform resource locators (URLs) that are mapped to various states of the single page (e.g., various states entered based on user interactions with dynamically generated content from the web application). The various states of the single page may be mapped to corresponding URLs based on the user interactions with respect to the single page. These URLs may be used to revisit the single page in its respectively corresponding states.

20 Claims, 10 Drawing Sheets

(56) References Cited

U.S. PATENT DOCUMENTS

| | | | |
|---|---|---|---|
| 2011/0173216 A1 | 7/2011 | Newman et al. | |
| 2012/0110110 A1* | 5/2012 | Luna | H04L 67/22 709/213 |
| 2012/0240033 A1 | 9/2012 | Soni et al. | |
| 2012/0303697 A1* | 11/2012 | Alstad | G06F 17/3089 709/203 |
| 2012/0311428 A1* | 12/2012 | Goedegebuure | G06F 17/30887 715/234 |
| 2014/0059522 A1* | 2/2014 | Chandra | G06F 11/3684 717/126 |

FOREIGN PATENT DOCUMENTS

| | | |
|---|---|---|
| KR | 1020090011210 A | 2/2009 |
| WO | WO-2011109516 A2 | 9/2011 |
| WO | WO-2014116361 A1 | 7/2014 |

OTHER PUBLICATIONS

"Australian Application Serial No. 2013375183, Response filed Jun. 20, 2016 to Examiner Report dated Mar. 16, 2016", 35 pgs.

"Australian Application Serial No. 2013375183, Subsequent Examiners Report dated Jul. 7, 2016", 2 pgs.

"Canadian Application Serial No. 2,897,508, Office Action dated Jun. 8, 2016", 3 pgs.

"European Application Serial No. 13872583.3, Extended European Search Report dated Aug. 2, 2016", 10 pgs.

"Korean Application Serial No. 2015-7022966, Office Action dated Jun. 18, 2016", w/ English, 13 pgs.

"Korean Application Serial No. 2015-7022966, Office Action dated Jun. 29, 2016", English Translation of Claims, 19 pgs.

"Korean Application Serial No. 2015-7022966, Response filed Aug. 18, 2016 to Office Action dated Jun. 18, 2016", with English translation of claims, 23 pgs.

Ali, Mesbah, et al., "Crawling Ajax-Based Web Applications through Dynamic Analysis of User Interface State Changes", ACM Transactions on the Web, vol. 6, No. 1, (Mar. 1, 2012) 1-30 pgs.

Todd, Kloots, "Implementing pushState for twitter.com", Retrieved from the Internet: <https://blog.twitter.com/2012/implementing-pushstate-for-twittercom>, (Dec. 7, 2012).

"European Application Serial No. 13872583.3,Communication pursuant to Rules 161(2) and 162 EPC dated Sep. 2, 2015", 2 pgs.

"International Application Serial No. PCT/US2013/074474, International Preliminary Report Patentability dated Aug. 6, 2015", 8 pgs.

"International Application Serial No. PCT/US2013/074474, International Search Report dated May 16, 2014", 2 pgs.

"International Application Serial No. PCT/US2013/074474, Written Opinion dated May 16, 2014", 6 pgs.

"Australian Application Serial No. 2013375183, Examiner Report dated Mar. 16, 2016", 2 pgs.

"European Application Serial No. 13872583.3, Response filed Feb. 2, 2016 to Communication pursuant to Rules 161(2) and 162 EPC dated Sep. 2, 2015", 14 pgs.

"Canadian Application Serial No. 2,897,508, Office Action dated May 2, 2017", 4 pgs.

"Chinese Application Serial No. 201380071349.8, Response filed Jul. 4, 2017 to Office Action dated Feb. 17, 2017".

"Chinese Application Serial No. 201380071349.8, Office Action dated Feb. 17, 2017", w/ English Translation, 17 pgs.

"European Application Serial No. 13872583.3, Response filed Mar. 1, 2017 to Extended European Search Report dated Aug. 2, 2016", 17 pgs.

Kloots, Todd, "Implementing pushState for twitter.com", [Online] Retrieved from the Internet :<http:/ /blog.twitter.com/2012/implementing -pushstate-for-twitter.com>, (Dec. 7, 2012), 8 pgs.

"Canadian Application Serial No. 2,897,508, Response filed Nov. 1, 2017 to Office Action dated May 2, 2017", 17 pgs.

"Chinese Application Serial No. 201380071349.8, Office Action dated Oct. 10, 2017", w/English abstract, 15 pgs.

"European Application Serial No. 13872583.3, Communication Pursuant to Article 94(3) EPC dated Aug. 30, 2017", 6 pgs.

\* cited by examiner

MAPPING PAGE STATES TO URLS

RELATED APPLICATION

This application claims the priority benefit of Provisional Patent Application No. 61/756,864, filed Jan. 25, 2013, which is incorporated herein by reference in its entirety.

TECHNICAL FIELD

The subject matter disclosed herein generally relates to the processing of data. In particular, the present disclosure addresses systems and methods to facilitate mapping of page states to uniform resource locators (URLs).

BACKGROUND

A network-accessible resource (e.g., a device, or data stored thereon) may be identified by a uniform resource identifier (URI). Examples of a URI include a URL, a uniform resource name (URN), or any suitable combination thereof. A URI may be, or include, a string of alphanumeric characters that corresponds to the network-accessible resource identified by the URI.

A web page may form all or part of a document or presentation that is identified by a URI. For example, a URL may identify a network-based location of the web page. A software application (e.g., an Internet browser application) may use the webpage's URL to access (e.g., request, read, retrieve, or download) the web page (e.g., from a web server machine to a web client device). In some situations, a web application executes on a web server machine and dynamically generates the web page based on (e.g., in response to) one or more user inputs received.

BRIEF DESCRIPTION OF THE DRAWINGS

Some embodiments are illustrated by way of example and not limitation in the figures of the accompanying drawings.

DETAILED DESCRIPTION

Figure 1:
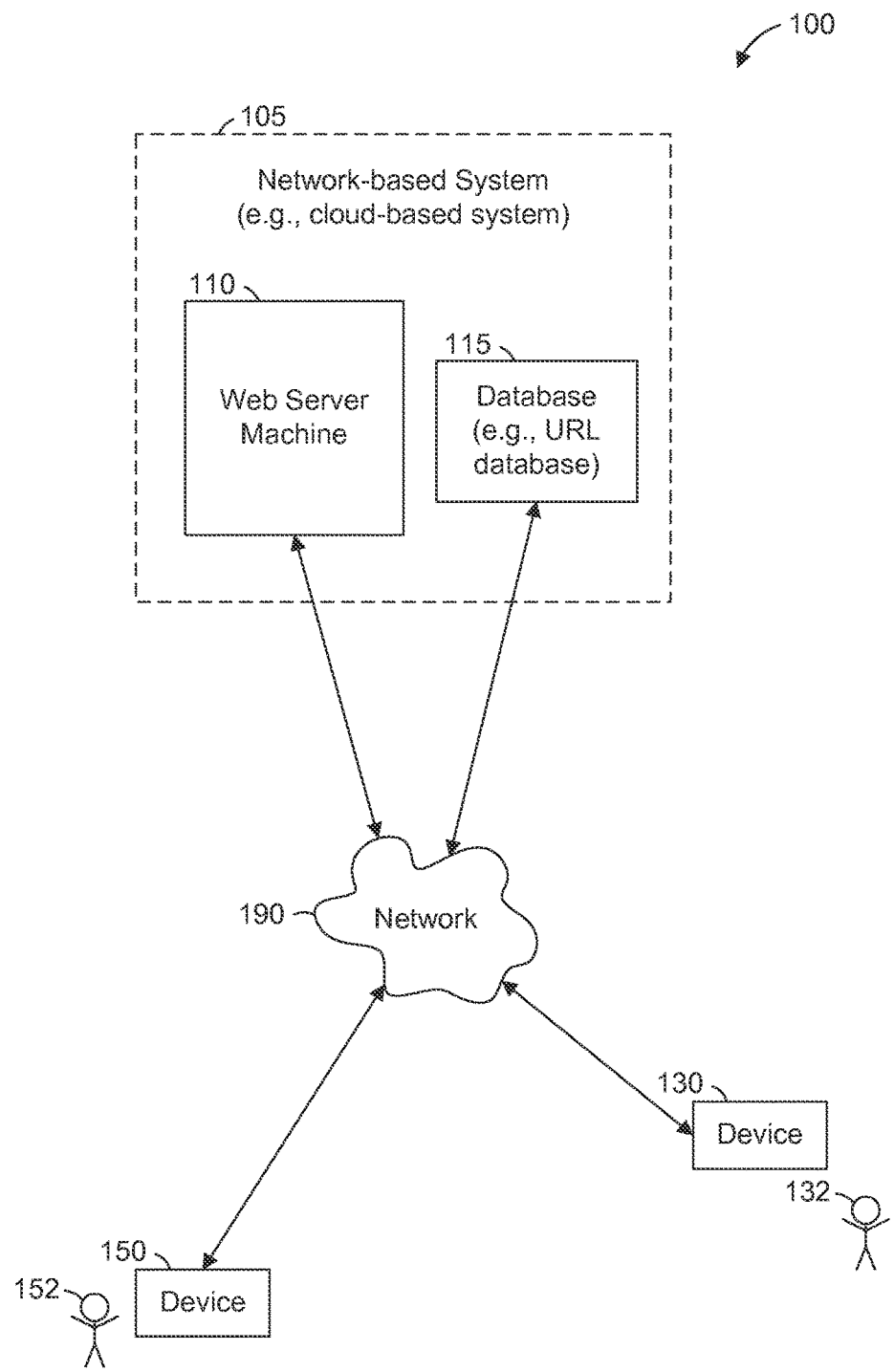
FIG. 1 is a network diagram illustrating a network environment suitable for mapping page states to URLs, according to some example embodiments.

Example methods and systems are directed to mapping page states to URIs (e.g., URLs). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

According to various example embodiments, one or more of the methods and systems discussed herein provide a way for managing consistent URLs on a single-page web application by mapping various states of a single page (e.g., a single web page that is generated and provided by the single-page web application) to various URLs. In the example context of a network-based commerce system (e.g., an online shopping website), such URLs may include category URLs (e.g., a URL that specifies a web page describing a category of items available for sale), product URLs (e.g., a URL that specifies a web page describing a product of which multiple items are specimens), item URLs (e.g., a URL that specifies a web page describing a specific item available for sale), or any suitable combination thereof.

Using an example embodiment of a method or system discussed herein, a client application displaying a single page from such a web application may display consistent and intuitive URLs that are mapped to various states of the single page (e.g., states entered based on one or more user interactions with dynamically generated content provided within the single page by the web application). The various states of the single page may be mapped to corresponding URLs based on the one or more user interactions with respect to the single page. These URLs may be used to revisit the single page in its various states that respectively correspond to these URLs. This approach may be contrasted with using hash fragments (e.g., hash tags) to denote various states of the single page (e.g., showing the same page URL in a browser, but with a different hash fragment for each state of the single page).

With some web applications, when a user types a URL into a browser (e.g., into a user interface of a browser application), the browser makes a URL request (e.g., call) to a web server (e.g., web server machine), and the web server provides (e.g., returns) dynamic content which the browser then presents as a single page (e.g., a single web page) to the user (e.g., displayed on a screen of a client device of the user). Subsequently, when the user interacts with any of this dynamic content (e.g., links, buttons, or hotspots) on the presented single page, the interaction may be handled by, for example:

1. Making another URL request to the web server, which tells the web server to resend the entire content (e.g., dynamic content) of the page, thus refreshing (e.g., repainting) the entire page; or 2. Making an Asynchronous JavaScript and XML (AJAX, where XML refers to eXtensible Markup Language) request (e.g., an AJAX call) to the web server and loading all the content of the page on the front end (e.g., into the browser on the client side), thus enabling the user to interact with any of the dynamic content (e.g., links, buttons, or hotspots) without refreshing or leaving the page, with additional requests (e.g., calls) being made to web server for additional data (e.g., additional dynamic content) only when needed.

Option 2 is sometimes used for building single-page web applications because of its ability to deliver a pleasant user experience. However, when the user interacts with the single page (e.g., a single web page) and navigates to different features of the web application, the state of the single page changes. For example, the page may take on a different appearance (e.g., present some of the dynamic content differently or present different content altogether). However, the URL of the page may remain the same, although a hash fragment (e.g., a hash tag) may be appended to the page's URL, which may cause the page's URL to appear non-intuitive, difficult to for users to read, and difficult for users to use (e.g., access dynamically generated content using a browser's "back" button or "forward" button, or copy and paste so other users may see the page in its current state).

In this context, one or more the methods and systems discussed herein may provide one or more of the following benefits:

1. Even though a web application (e.g., a mobile web site for mobile devices) may be designed as a single page, users see a different URL (e.g., in their browsers) for different states (e.g., areas, configurations, or histories) of the single page. These different URLs may be managed (e.g., generated, mapped, or both) to have a consistent appearance (e.g., an intuitive look or easily understandable syntax).

2. A user may go back and forth within his action history (e.g., back and forth within a history of URLs previously visited) and navigate through previously presented states of the single page.

3. In some example embodiments, an interaction by the user with the single page generates a state (e.g., a new state), and that state may be mapped to a valid URL (e.g., URL that includes a string of alphanumeric characters).

4. In some example embodiments, an interaction by the user with the single page causes the browser to display an updated URL (e.g., mapped to the corresponding state of the single page) without reloading the single page.

5. In some example embodiments, a user may use the browser to manually request a refresh of the single page, and the single page will be reloaded (e.g., repainted or refreshed) with the same state that was displayed prior to the refresh.

6. In some example embodiments, a state of the page corresponds to a specific view of the page, and the corresponding URL for that state may be mapped to that specific view the page.

Additional benefits that may be obtained include, for example:

1. URLs for various page states are readily indexable by search engines for search engine optimization (SEO) purposes (e.g., SEO-friendly URLs).

2. A user can easily copy an intuitive URL for a particular state of a page from his browser and share the URL on one or more social media sites or anywhere else. When someone else clicks on that URL, they will see the same page that was shared by the user, in the same particular state.

3. User experiences may be enhanced or improved as a result of dynamic content being loaded just one time (e.g., the first time a piece of dynamic content is needed), regardless how many times a user leaves and revisits a particular state of the page.

4. In some example embodiments, a web application may provide a customized page that is tailored (e.g., personalized) to a group of users interested in similar content, for example, by providing a mapped URL that specifies a particular state (e.g., a customized state that is preconfigured for the group of users) of the page.

According to various example embodiments, a web server machine may be configured to execute a web application with a back-end module (e.g., a URL validation module) and provide a web client device with a browser-executable front-end module (e.g., a URL management module). For example, a set of one or more representational state transfer (REST) services may be executed on the server side (e.g., by the web server machine, as configured by a URL validation module of the web application) to validate any URL path (e.g., via execution of the URL validation module), while a set of one or more JavaScript programs are executed on the client side (e.g., on the browser side, by the client device, as configured by a URL management module) to manage URLs and states for the single-page web application (e.g., by execution of a URL management module).

FIG. 1 is a network diagram illustrating a network environment 100 suitable for mapping page states to URLs, according to some example embodiments. The network environment 100 includes a web server machine 110, a database 115, and devices 130 and 150, all communicatively coupled to each other via a network 190. The web server machine 110 and the devices 130 and 150 may each be implemented in a computer system, in whole or in part, as described below with respect to FIG. 10.

The web server machine 110 may be configured (e.g., by special-purpose software) to perform any one or more the methodologies discussed herein. The web server machine 110, with or without the database 115, may form all or part of a network-based system 105 that provides one or more web services.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Accordingly, the web server machine 110 (e.g., as part of the network-based system 105) may provide one or more web services to one or more web clients (e.g., devices 130 and 150). One or both of the devices 130 and 150 may be a mobile device (e.g., a smart phone, vehicle computer, or a tablet computer) through which a user (e.g., user 132 or user 152) may access and use the one or more web services provided by the web server machine 110.

For example, the web server machine 110 may provide (e.g., serve) a page of content (e.g., a single web page that includes and presents dynamically generated web content) to the device 130. The device 130 may execute an application (e.g., a browser application) that allows the user 132 to interact with the provided page of content (e.g., touch on a link to request additional content, touch and hold over a hotspot in the presented content to open a pop-up window with additional content, mouse over presented content to trigger notification, manipulate the presentation of content by clicking and dragging on it, or any suitable combination thereof).

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the web server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
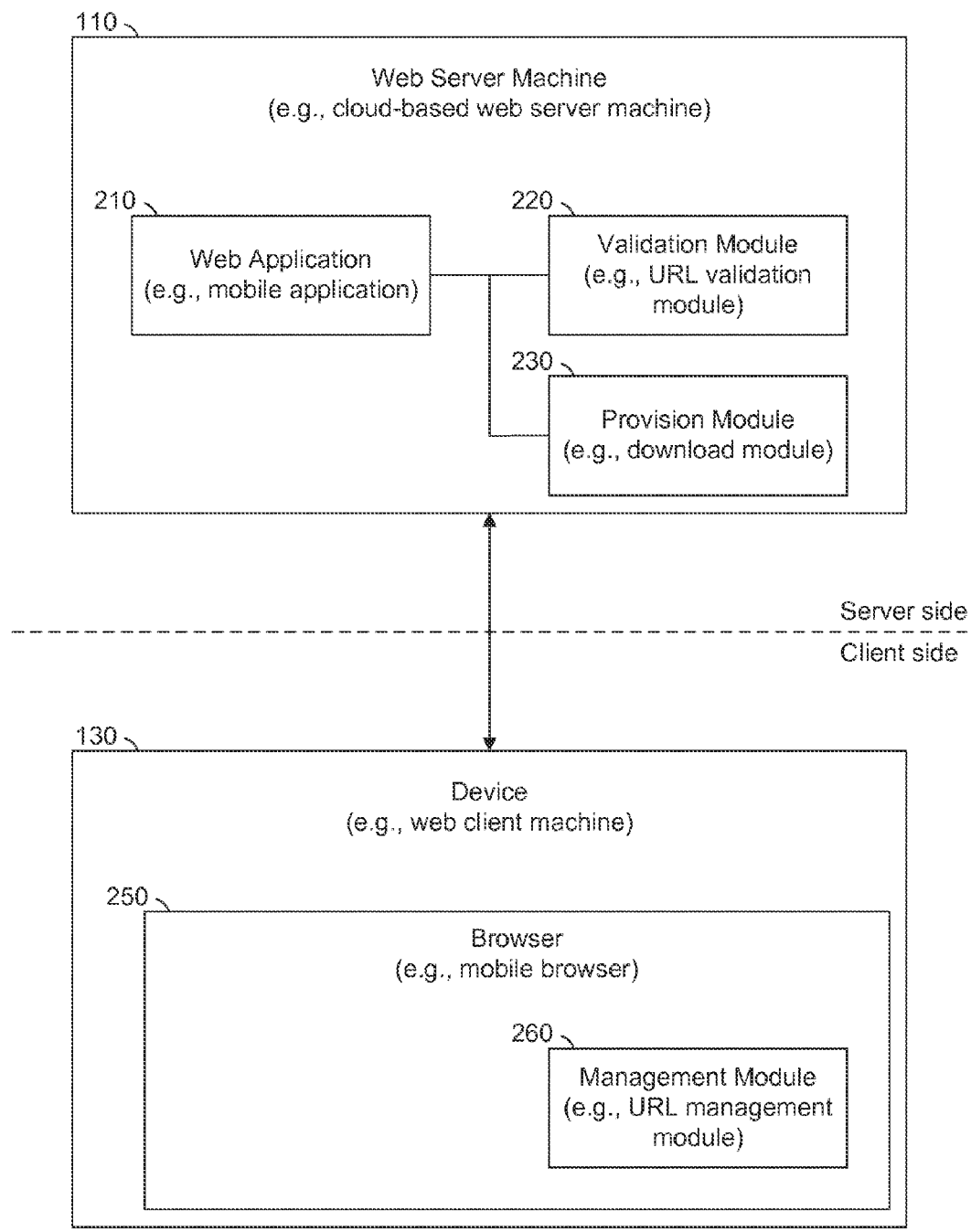
FIG. 2 is a block diagram illustrating components of a web server machine and a device, according to some example embodiments.

FIG. 2 is a block diagram illustrating components of the web server machine 110 and the device 130, according to some example embodiments. The web server machine 110 is shown as including a web application 210 (e.g., a web service application executing on the web server machine 110), a validation module 220 (e.g., a further web service application executing on the web server machine 110), and a provision module 230 (e.g., yet another web service application executing on the web server machine 110), all configured to communicate with each other (e.g., via a bus, shared memory, or a switch).

The web application 210 is an application that provides a web service to one or more devices (e.g., device 130), and the web application 210 may be a mobile application (e.g., an application that provides a web service to one or more mobile devices). According to some example embodiments, the validation module 220 is a URL validation module configured to validate one or more URLs (e.g., as a web service provided to one or more devices). The provision module 230 is configured to provide software (e.g., browser executable software, such as a JavaScript program or Java applet).

The device 130 is shown as including a browser 250 (e.g., a browser application executing on the device 130), which includes a management module 260 (e.g., browser-executable software, such as a JavaScript program or Java applet). Within the web server machine 110, the provision module 230 may be configured as a download module (e.g., an application that provides software, for example, the management module 260, to one or more devices).

Any one or more of the modules or applications described herein may be implemented using hardware (e.g., a processor of a machine) or a combination of hardware and software. For example, any module or application described herein may configure a processor to perform the operations described herein for that module. Moreover, any two or more of these modules or applications may be combined into a single module, and the functions described herein for a single module may be subdivided among multiple modules or applications. Furthermore, according to various example embodiments, modules and applications described herein as being implemented within a single machine, database, or device may be distributed across multiple machines, databases, or devices.

FIG. 3-6 are annotated flowcharts illustrating and describing operations of the web server machine 110 and the device 130 in performing a method 300 of mapping page states to URLs, according to some example embodiments. Operations in the method 300 may be performed, respectively, by the web server machine 110 or the device 130, using one or more of the modules described above with respect to FIG. 2.

Figure 3:
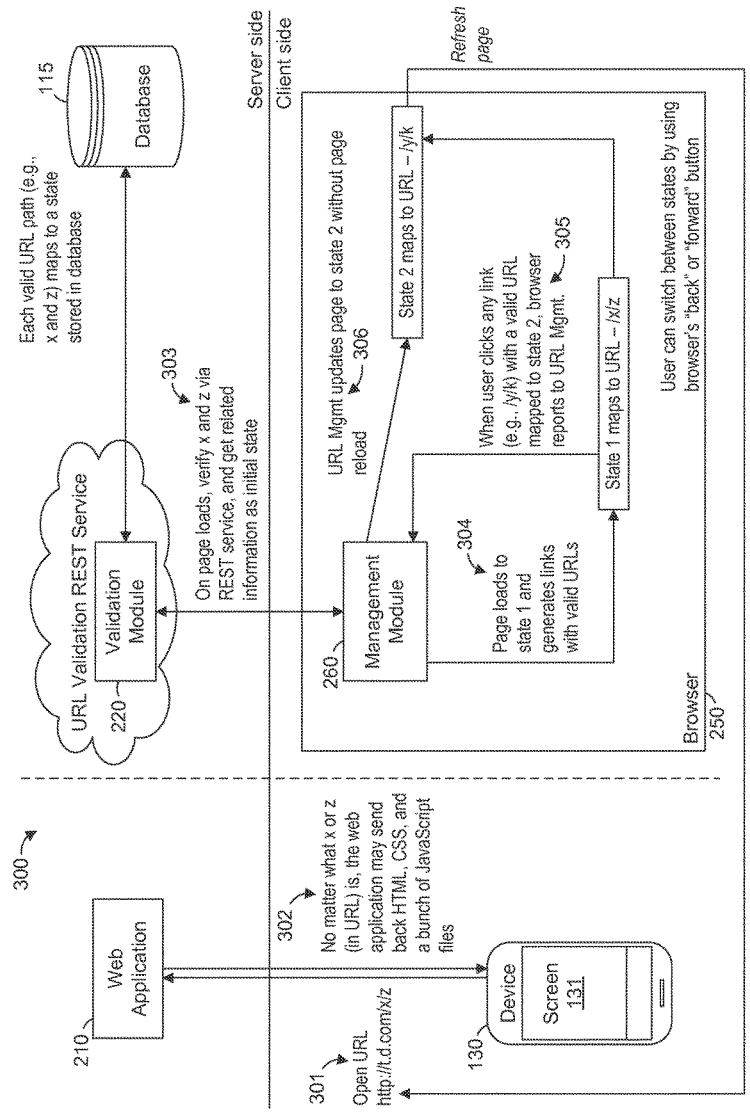
FIG. 3-6 are annotated flowcharts illustrating and describing operations of the web server machine and the device in performing a method of mapping page states to URLs, according to some example embodiments.

As shown in FIG. 3, in operation 301, the device 130 opens a URL, which may correspond to the web application 210. For example, the device 130 may execute the browser 250, which may be configured to request a web page (e.g., a single-page web page) from the web application 210 executing on the web server machine 110. This request may be initiated by the user 132 in interacting with a browser 250. The example URL shown in FIG. 3, "http://t.d.com/x/z," includes a protocol name ("http"), a domain name ("d.com"), a subdomain name ("t"), and a folder path ("/x/z"). In the example URL shown, there are no URL parameters, which are alphanumeric strings that begin with a question mark. ("?") and are separated by ampersands ("&"). In the example URL shown, there are also no fragments (e.g., hash fragments, hash tags, or named anchors), which are alphanumeric strings that begin with a number sign ("#", also called a pound sign or a hash).

In operation 302, the web application 210 responds by providing content (e.g., dynamically generated web content) to the device 130. For example, the content provided may include hypertext markup language (HTML) data, cascading style sheet (CSS) data, browser-executable software (e.g., JavaScript files), or any suitable combination thereof. In some example embodiments, the provided content may include the management module 260 (e.g., as browser-executable software for execution in the browser 250 on the device 130). As noted in FIG. 3, the provided content may be independent of any folder path (e.g., "/x/z") specified in the URL. That is, the provided content may depend solely on the protocol name and the domain name, or in alternative example embodiments, solely on the protocol name, the subdomain name, and the domain name.

In operation 303, the validation module 220 verifies some or all of the folder path specified in the URL (e.g., verifies "x" and "z"). As noted in FIG. 3, the validation module 220 may form all or part of a URL validation service, which may be implemented as a REST service (e.g., a "RESTful" service). The URL's folder path ("/x/z", or "x" and "z") is mapped to a state, and this state may be stored in the database 115. The validation module 220 may therefore access the database 115 to verify some or all of the folder path. This verification may be performed in response to the URL being opened in operation 301 (e.g., a page load). As noted in FIG. 3, the database 115 may store information related to the folder path ("/x/z"), and this related information may be retrieved by the validation module 220 (e.g., as an initial state of the requested web page. According to various example embodiments, operation 303 may be performed when the URL is first opened by the device 130 (e.g., initial page load), when the URL is revisited by the device 130 (e.g., subsequent page load), or both.

In operation 304, the management module 260 may receive (e.g., via the browser 250) the verification of some or all of the folder path ("/x/z" or "x") from the validation module 220, and the management module 260 may receive (e.g., via the browser 250) information related to the folder path ("/x/z") from the validation module 220. Based on this, the management module 260 may allow or cause the device 130 (e.g., via the browser 250) to load the requested web page and display of the web page on a screen 131 of the device 130. The requested web page may be loaded in a first state (e.g., initial state or "state 1"), based on the related information received by the management module 260 (e.g., stored in the database 115 as corresponding to the URL's folder path).

In operation 305, the user 132 interacts with the loaded web page and its contents (e.g., activates a link, button, or hotspot). For example, the user 132 may click on a link that references another URL, which may correspond to the web application 210 (e.g., "http://t.d.com/y/k" or just "/y/k"). As noted in FIG. 3, this further URL may be mapped to a second state (e.g., subsequent state or "state 2") of the web page. This second state may be stored in the database 115. When the user 132 activates content that references this further URL, the management module 260 detects this (e.g., from the browser 250 notifying the management module 260). In some example embodiments, the management module 260 requests verification of some or all of this further URL (e.g., the folder path "/y/k") from the validation module 220, and a validation module 220 may respond with the requested verification, as well as information related to the second state of the web page.

In operation 306, the management module 260 may receive verification of some or all of the further URL (e.g., folder path "/y/k") that corresponds to the second state of the web page, and they receive information related to the second state or its corresponding folder path ("/y/k"). Based on this, the management module 260 may allow or cause the device 130 (e.g., via the browser 250) to update the web page to its second state. This may be performed without reloading the web page. As noted in FIG. 3, the user 132 can switch between the first state and the second state by using one or more page navigation controls within the browser 250 (e.g., a "back" button, a "forward" buttons, or both).

As shown in FIG. 3, if the browser 250 is displaying the second state of the web page ("state 2" which is mapped to the folder path "/y/k"), and the user 132 requests that the browser 250 refresh the web page, the method 300 returns to operation 301, in which the URL for the web page is opened. This time, however, the URL includes the folder path ("/y/k", not shown) that corresponds to the second state of the web page.

Figure 4:
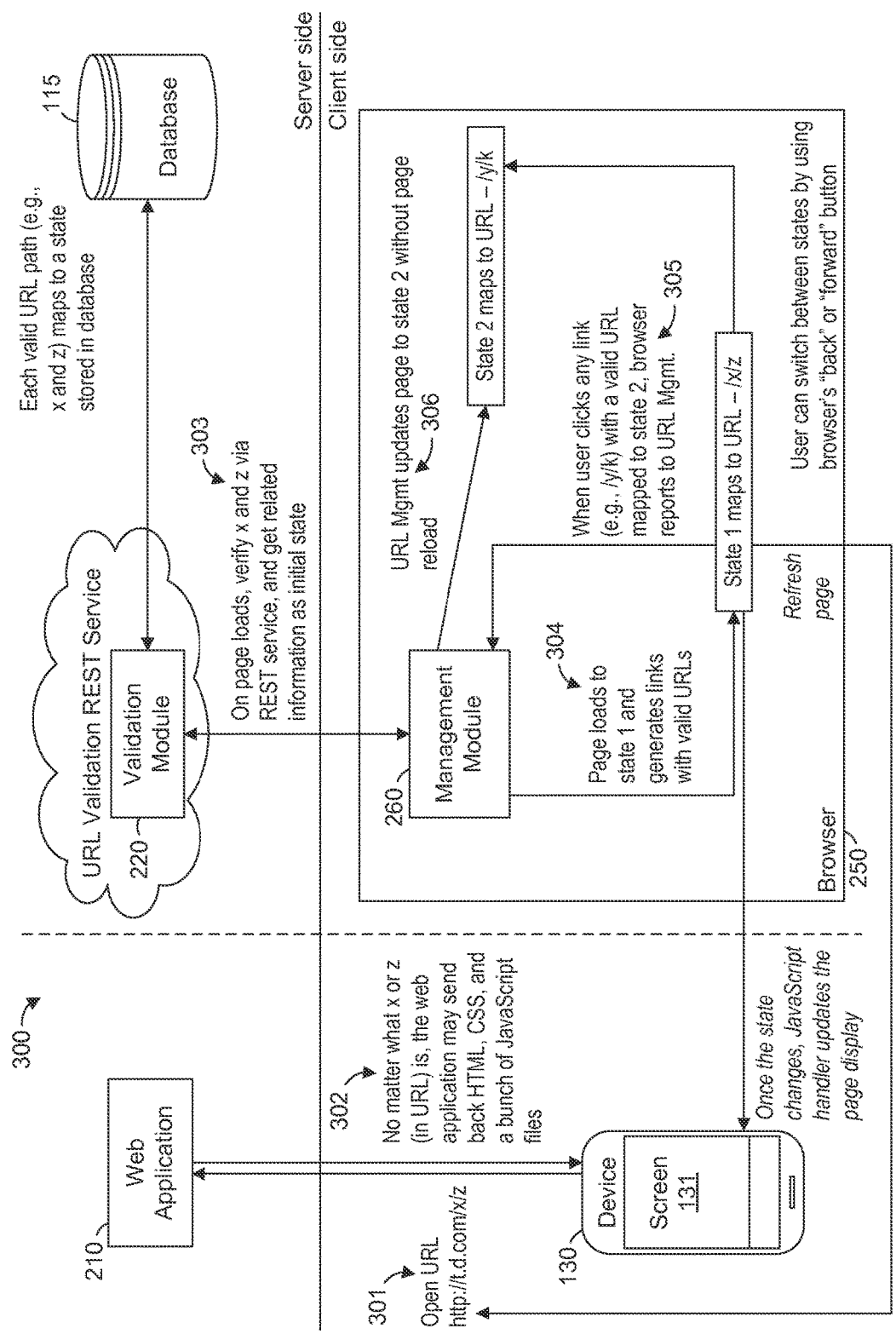

As shown in FIG. 4, if the browser 250 is displaying the first state of the web page ("state 1" which is maps to the folder path "/x/z"), and the user 132 request that the browser 250 refresh the web page, the method 300 returns to operation 301, in which the URL for the web page is opened. As shown in FIG. 4, the URL includes the folder path ("/x/z") that corresponds to the first state of the web page. Otherwise, FIG. 4 depicts an example embodiment similar to the example embodiment shown in FIG. 3.

Figure 5:
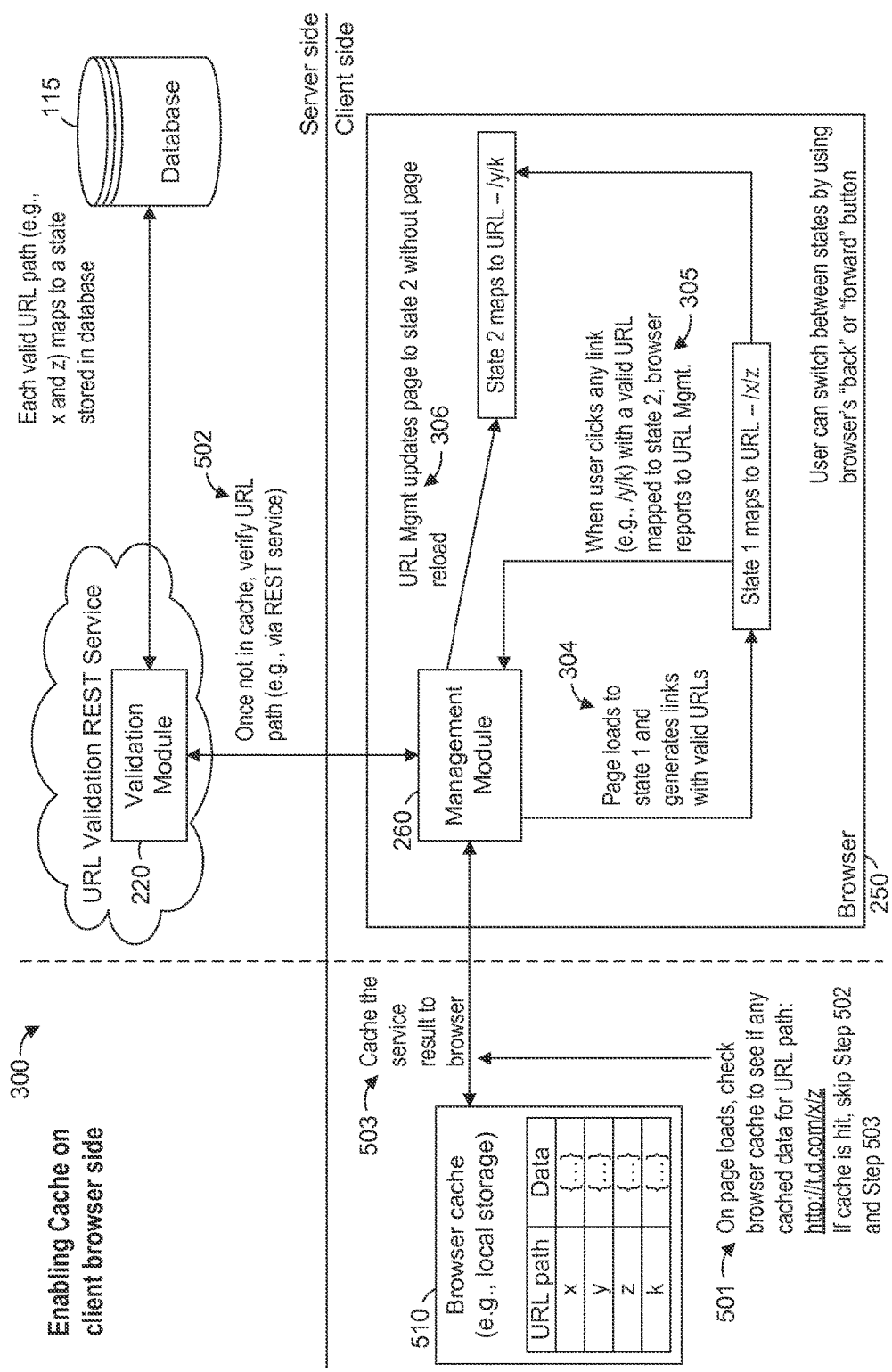

As shown in FIG. 5, the browser 250 may utilize a browser cache 510 to store (e.g., temporarily or permanently) information corresponding to various states of the web page (e.g., stored by the database 115 and provided by the validation module 220). The browser cache 510 may form all or part of a local storage (e.g., memory) or other repository of data easily accessible by the device 130. In example embodiments that utilize the browser cache 510, the method 300 includes one or more of operations 501, 502, and 503.

In operation 501, if the user 132 requests that the URL "http://t.d.com/x/z" be opened (e.g., a page load request), the management module 260 may check the browser cache 510 for any cached data related to the URL's folder path ("/x/z"). For example, the browser cache 510 may store information related to the first state of the web page (e.g., information that defines the first state of the web page), and the management module 260 may check the browser cache 510 for such related information. If the browser cache 510 contains such cached data, the cached data is used by the management module 260 to allow or cause the device 130 (e.g., by the browser 250) to load the web page in its first state, which corresponds to the folder path "/x/z". In this situation, operations 502 and 503 may be omitted.

In operation 502, if the browser cache 510 contains no data related to the folder path ("/x/z"), the management module 260 requests that the validation module 220 provide a verification of the folder path. This request and its corresponding response by the validation module 220 may be performed in a manner similar to that described above with respect to operation 303.

In operation 503, the management module 260 may receive (e.g., via the browser 250) information related to the folder path ("/x/z") from the validation module 220, and the management module 260 may store (e.g., cache) this received information in the browser cache 510. Thus, this related data may be available and easily accessible by the browser 250 for responding to future requests to open the URL "http://t.d.com/x/z". As noted above, in operation 304, the management module 260 may receive (e.g., via the browser 250) verification of some or all of the folder path ("/x/z"), and based on this verification, the management module 260 may allow or cause the device 130 (e.g., via the browser 250) to load the web page in its first state, which corresponds to the folder path "/x/z". According to various example embodiments, operation 503 may be performed prior to operation 304, in conjunction with operation 304, as part of operation 304, or after operation 304.

Figure 6:
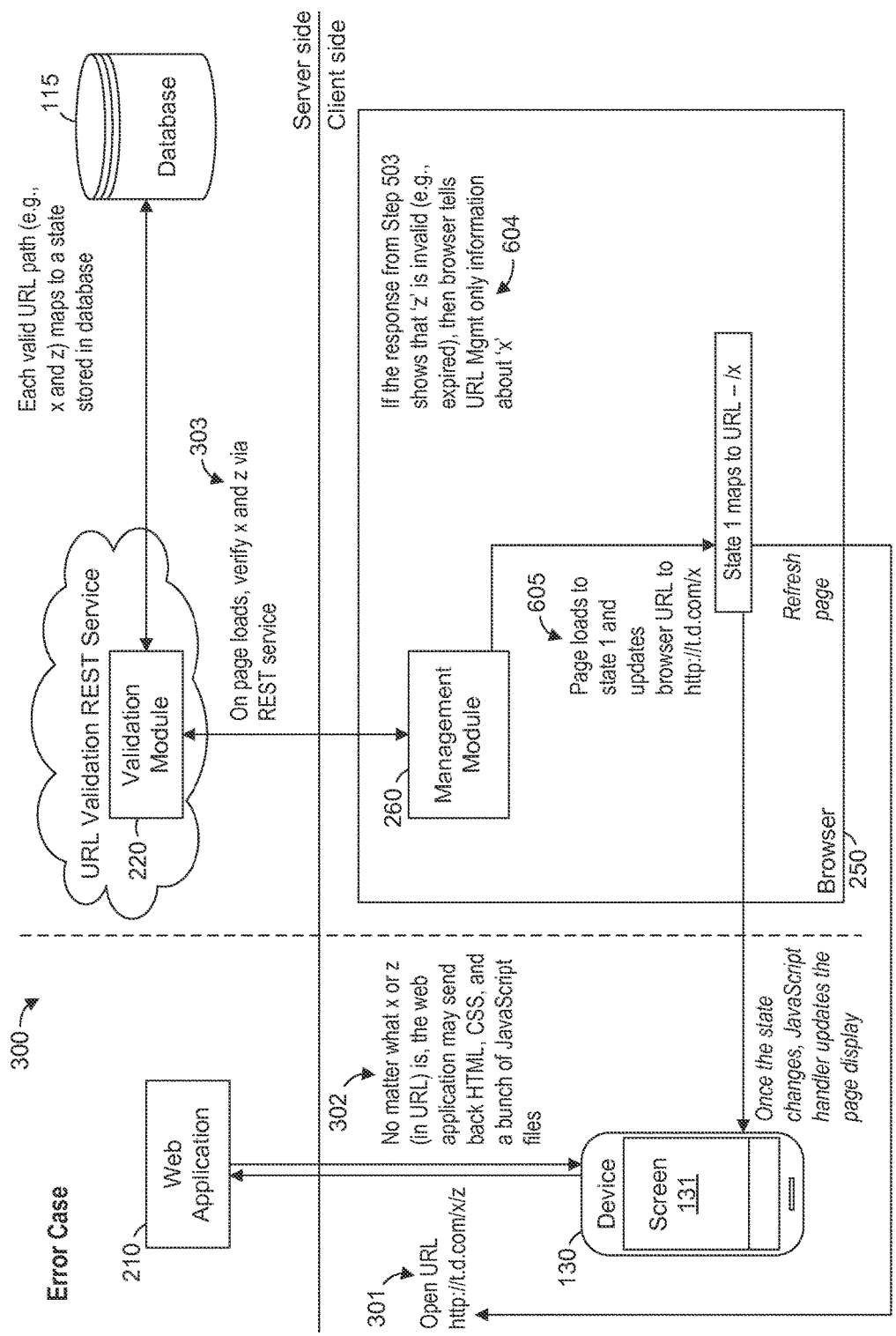

As shown in FIG. 6, in situations where the validation module 220 provides no verification of the folder path "/x/z" or provides a response that indicates some or all of the folder path (e.g., "x" or "z") is invalid, the method 300 may include one or more of operations 604 and 605 to handle such error cases. In the example shown in FIG. 6, the folder path "/x/z" is partially invalid. Specifically, in this example, "x" is valid, while "z" is not. For example, "x" may be unexpired (e.g., as an alphanumeric string for designating part of a folder path), while "z" may be expired (e.g., as an alphanumeric string for designating part of the folder path).

In operation 604, the management module 260 may receive (e.g., via the browser 250) information related only to the valid portion of the folder path (e.g., "x") from the validation module 220. Based on this, in operation 605, the management module 260 may allow or cause the device 130 (e.g., via the browser 250) to load the requested web page in a state that corresponds to the valid portion of the folder path (e.g., based on the information received in operation 604). In some example embodiments, this state is the same as the web page's first state (e.g., initial state or "state 1").

Figure 7:
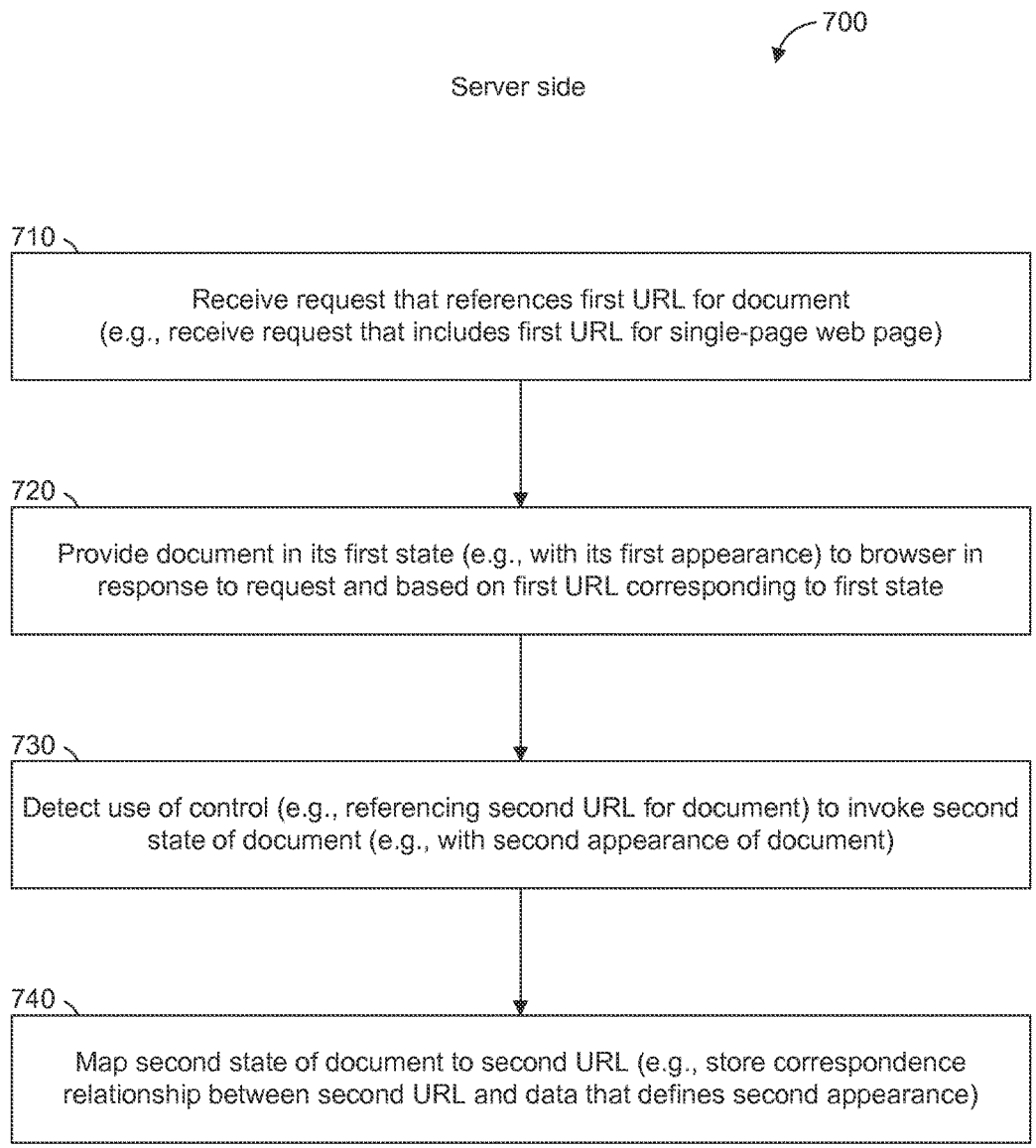
FIG. 7-8 are flowcharts illustrating operations of the web server machine in performing a method of mapping page states to URLs, according to some example embodiments.
Figure 8:
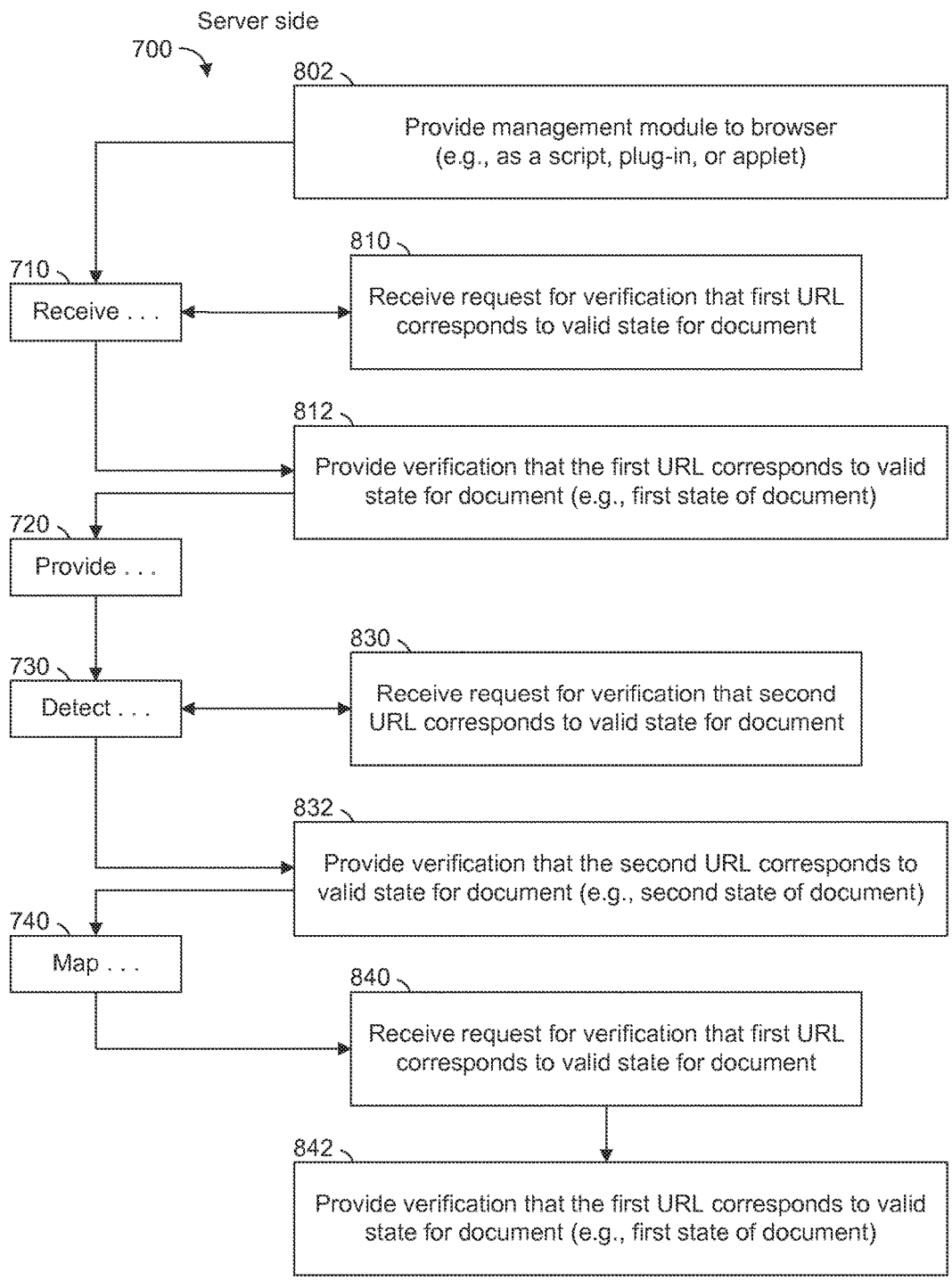

FIG. 7-8 are flowcharts illustrating operations of the web server machine 110 in performing a method 700 of mapping page states to URLs, according to some example embodiments. Operations in the method 700 may be performed using modules and applications described above with respect to FIG. 2. As shown in FIG. 7, the method 700 includes operations 710, 720, 730, and 740.

In operation 710, the web application 210 of the web server machine 110 receives a request (e.g., a page request) that references a first URL (e.g., http://t.d.com/x/z, with a first folder path "/x/z") by which a document (e.g., a web page with dynamically generated content) is locatable for display in the browser 250 (e.g., for display via the screen 131 of the device 130). This first URL may correspond to a first state in which the document has a first appearance (e.g., a first arrangement of content, a first set of content elements, or both). For example, the web application 210 may receive a request that includes the first URL, which may be usable to locate a single-page web page of dynamically generated content.

In operation 720, the web application 210 provides the requested document in its first state (e.g., with its first appearance) to the browser 250. The requested document may be provided in response to the request received in operation 710, and provision of the requested document may also be based on the first URL, which may correspond to the first state of the document (e.g., corresponding to the document's first appearance). In its first state, the document may include a control (e.g., a link, a button, a hotspot, or any suitable combination thereof) that is usable to invoke a second state in which the document has a second appearance (e.g., a second arrangement of content, a second set of content elements, or both). The control may reference (e.g., contain a reference to) a second URL (e.g., http://t.d.com/y/k, with a second folder path "/y/k") by which the document is locatable for display in the browser 250.

In operation 730, the validation module 220 of the web server machine 110 detects use of the control (e.g., the link, the button, the hotspot, or any suitable combination thereof) to invoke the second state of the document (e.g., with the second appearance of the document). As noted above, the control may reference (e.g., by inclusion) the second URL, and the validation module 220 may detect the use of the control by detecting a request that the document be provided in its second state (e.g., with its second appearance) for display in the browser 250. For example, the validation module 220 may directly receive such a request from the browser 250 (e.g., from browser-executable software, such as the management module 260). As another example, the validation module 220 may detect that the web application 210 receives such a request from the browser 250 (e.g., by monitoring the web application 210 or receiving a notification from the web application 210).

In response to the use of the control, the browser 250 may display the document in its second state (e.g., with its second appearance). For example, information related to the second state (e.g., information that defines the second state) may be Obtained by the browser 250 (e.g., by the management module 260) from the validation module 220, from the web application 210, from the database 115, from the browser cache 510, or any suitable combination thereof.

In operation 740, the validation module 220 of the web server machine 110 maps the second state of the document to the second URL (e.g., http://t.d.com/y/k). For example, the validation module 220 may map the second state to the second URL by storing a correspondence relationship between the second URL and data that defines the second appearance of the document (e.g., the related information discussed above with respect to operation 730). The correspondence relationship, the second URL, the data that defines the second appearance, or any suitable combination thereof, may be stored by the validation module 220 in the database 115 (e.g., in row of a table or as a triplet).

As shown in FIG. 8, the method 700 may include one or more of operations 802, 810, 812, 830, 832, 840, and 842. Operation 802 may be performed prior to operation 710 or in response to the request received in operation 710. In operation 802, the provision module 230 of the web server machine 110 provides the management module 260 to the browser 250 (e.g., for execution within the browser 250, for example, as browser-executable software, such as a plug-in, an applet, a widget, a script, or any suitable combination thereof).

After being provided to the browser 250, the management module 260 may configure the browser 250 to store information related to the second state (e.g., data that defines the second appearance) of the document locatable by the first URL (e.g., http://t.d.com/x/z) referenced by the request received in operation 710. For example, the management module 260 may configure the browser 250 to store such related information in the browser cache 510. The management module 260 may also configure the browser 250 to store the correspondence relationship between the second URL (e.g., http://t.d.com/y/k) and the information related to the second state. This correspondence relationship may also be stored in the browser cache 510. The management module 260 may further configure to browser 250 to request verification that one or more URLs (e.g., the first URL, the second URL, or both) correspond to a valid state of the document (e.g., an unexpired state).

Operation 810 may be performed as part (e.g., a precursor task, a subroutine, or a portion) of, or in parallel with, operation 710, in which the request that references the first URL is received. In operation 810, the validation module 220 of the web server machine 110 receives a request for verification that the first URL corresponds to a valid state (e.g., the first state, which may be a non-expired state) for the document. According to various example embodiments, the validation module 220 may perform some or all of the requested verification (e.g., by accessing a lookup table within the database 115 that indicates which URLs are valid).

In operation 812, the validation module 220 provides the requested verification that the first URL (e.g., http://t.d.com/x/z, with its first folder path "/x/z") corresponds to a valid state of the document. For example, the validation module 220 may provide the browser 250 (e.g., via the management module 260) an indication that the first URL corresponds to the first state (e.g., with the first appearance) of the document, and that this first state is a valid (e.g., non-expired) state for the document. Operations 810 and 812 within the method 700 may correspond to all or part of operation 303 within the method 300. In some example embodiments, operation 720 may be performed based on the verification provided in operation 812.

Operation 830 may be performed as part of or in parallel with, operation 730, in which the validation module 220 detects the use of the control to invoke the second state of the document. In operation 830, the validation module 220 of the web server machine 110 receives a request for verification that the second URL corresponds to a valid state (e.g., the second state, which may be a non-expired state) for the document. According to various example embodiments, the validation module 220 may perform some or all of the requested verification (e.g., by accessing a lookup table within the database 115 that indicates which URLs are valid).

In operation 832, the validation module 220 provides the requested verification that the second URL (e.g., http://t.d.com/y/k, with its second folder path "/y/k") corresponds to a valid state of the document. For example, the validation module 220 may provide the browser 250 (e.g., via the management module 260) an indication that the second URL corresponds to the second state (e.g., with the second appearance) of the document, and that this second state is a valid (e.g., non-expired) state for the document. Operations 830 and 832 within the method 700 may correspond to all or part of operation 305 within the method 300. In some example embodiments, data that defines the second state of the document may be provided (e.g., by the web application 210, the validation module 220, or both) to the browser 250 (e.g., via the management module 260) based on the verification provided in operation 832.

Operation 840 may be performed while the browser 250 is displaying the second state of the document (e.g., on the screen 131 of the device 130). In some example embodiments, the document in its second state may lack any control (e.g., any link, button, or hotspot) that is usable to invoke the first state of the document (e.g., first state in which the document has its first appearance). In these situations, the user 132 may wish to redisplay the document in its first state by giving the browser 250 a command to navigate backwards within a history of URLs (e.g., URLs that correspond to content previously displayed by the browser 250). For example, the user 132 may wish to have the browser 250 execute a "back" command to redisplay the document in its first state.

In some example embodiments, operation 840 may be performed while the browser displaying some further content (e.g., third state of the document or another document entirely), and the user 132 may wish to redisplay the document in its first state. In these situations, the user 132 may wish to redisplay the document in its first state by giving the browser 250 a command to navigate forwards within the history of URLs for the browser 250. For example, the user 132 may wish to have the browser 250 execute a "forward" command to redisplay the document in its first state.

In certain example embodiments, operation 840 may be performed while the browser displaying the first state of the document (e.g., as a result of navigating within the history of URLs). In these situations, the user 132 may wish to reload (e.g., refresh) the document in its first state by having the browser 250 execute a "reload" command, a "refresh" command, or a "redraw" command.

In operation 840, the validation module 220 of the web server machine 110 receives a request for verification that the first URL corresponds to a valid state (e.g., the first state, which may be a non-expired state) for the document. As noted above, the validation module 220 may perform some or all of the requested verification (e.g., by accessing a lookup table within the database 115 that indicates which URLs are valid). According to various example embodiments, the receiving of this request may be a result of the browser 250 executing a user command (e.g., a "back" command, a "forward" command, a "refresh" command, or any suitable combination thereof).

In operation 842, the validation module 220 provides the requested verification that the first URL (e.g., http://t.d.com/x/z, with its first folder path "/x/z") corresponds to a valid state of the document. As noted above, the validation module 220 may provide the browser 250 (e.g., via the management module 260) an indication that the first URL corresponds to the first state (e.g., with the first appearance) of the document, and that this first state is a valid (e.g., non-expired) state for the document. According to some example embodiments, data that defines the first data the document may be provided (e.g., by the web application 210, the validation module 220, or both) to the browser 250 (e.g., via the management module 260) based on the verification provided in operation 842.

Figure 9:
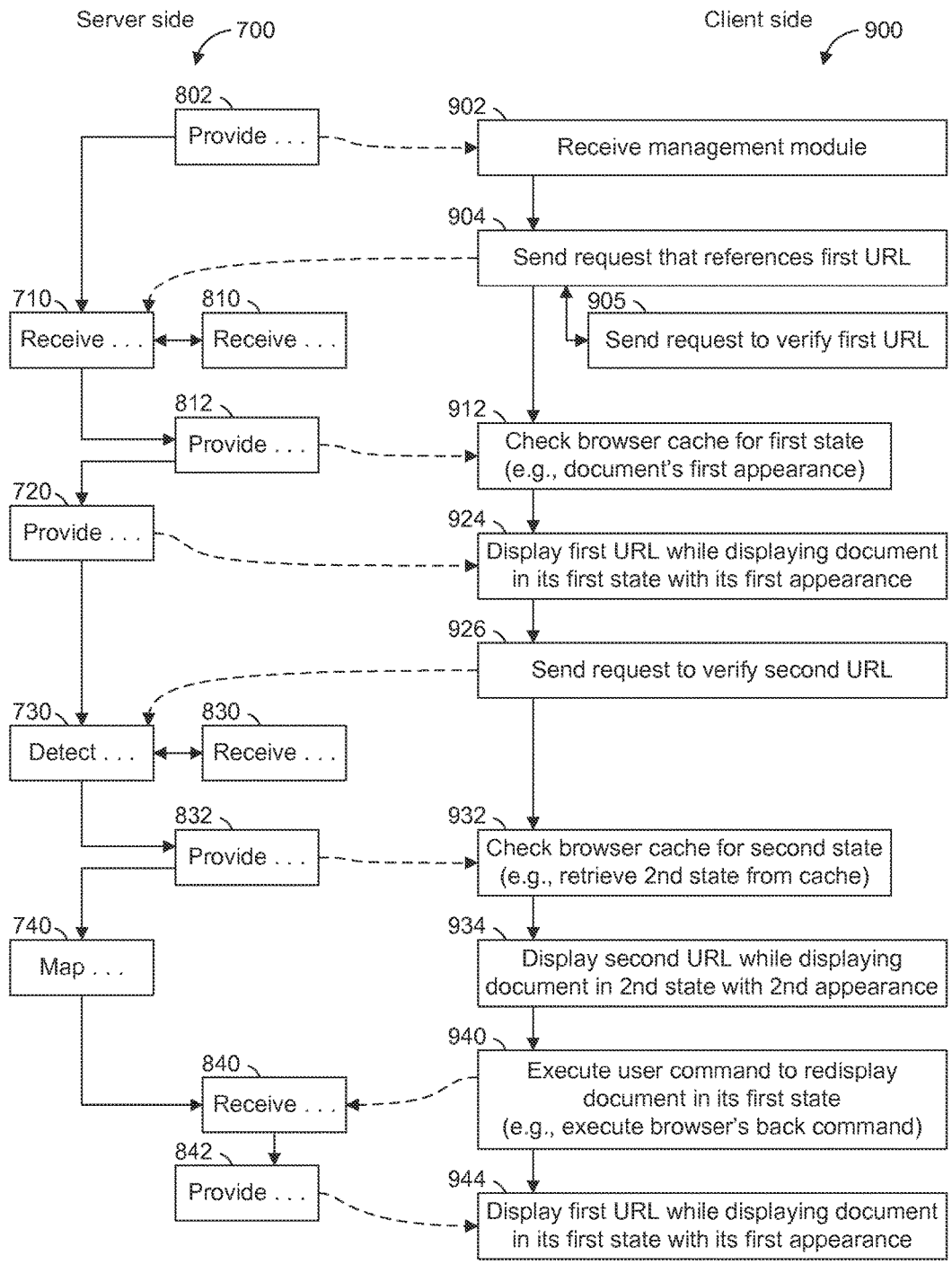
FIG. 9 is a flowchart illustrating operations of the web server machine alongside operations of the device in performing a method of using page states that are mapped to URLs, according to some example embodiments.

FIG. 9 is a flowchart illustrating operations in the method 700 alongside operations of the device 130 in performing a method 900 of using page states that are mapped to URLs, according to some example embodiments. Operations in the method 900 may be performed using modules and applications described above with respect to FIG. 2. As shown in FIG. 9, the method 900 includes one or more of operations 902, 904, 905, 912, 924, 926, 932, 934, 940, and 944.

In operation 902, the device 130, the browser 250, or both, receives the management module 260 provided by the web server machine 110 in operation 802. The browser 250 may then incorporate or execute the management module 260 (e.g., as browser-executable software, such as a plug-in, an applet, a widget, a script, or any suitable combination thereof).

In operation 904, the browser 250 sends the request received by the web server machine 110 in operation 710. As noted above, this request references the first URL (e.g., http://t.d.com/x/z, with its first folder path "/x/z") by which the document is locatable.

Operation 905 may be performed as part of, or in parallel with, operation 904. In operation 905, the management module 260 of the device 130 sends the request received by the web server machine 110 in operation 810, which may be a part of operation 710. As noted above, this request may be a request for verification that the first URL (e.g., http://t.d.com/x/z) corresponds to a valid state of the document.

In operation 912, the management module 260 of the device 130 accesses the browser cache 510 and checks the browser cache 510 for any data that defines the first state of the document (e.g., data that defines the first appearance of the document). Operation 912 may be performed in response to the verification provided by the web server machine 110 in operation 812 (e.g., the verification that the first URL corresponds to a valid state for the document). As noted above, if such data is present in the browser cache 510, it may be used (e.g., retrieved) by the management module 260, by the browser 250, or both, to display the document in its first state (e.g., with its first appearance) on the screen 131 of the device 130.

In operation 924, the browser 250 on the device 130 displays the document in its first state, with its first appearance, and may display the first URL (e.g., http://t.d.com/x/z) which corresponds the first state, while displaying the document in its first state. According to various example embodiments, the first URL is devoid of any hash fragments (e.g., hash tags), and the first URL is displayed by the browser 250 without any hash fragment included in the first URL. The management module 260 of the device 130 may fully or partially control the browser 250 during performance of operation 924.

In operation 926, the management module 260 (e.g., executing as part of the browser 250) sends the request received by the web server machine 110 in operation 830, which may be part of operation 730. As noted above, this request references the second URL (e.g., http://t.d.com/y/k, with its second folder path "/y/k") by which the document is locatable. As noted above, this request may be a request for verification that the second URL corresponds to a valid state of the document.

In operation 932, the management module 260 of the device 130 accesses the browser cache 510 and checks the browser cache 510 for any data that defines the second state of the document (e.g., data that defines the second appearance of the document). Operation 932 may be performed in response to the verification provided by the web server machine 110 in operation 832 (e.g., the verification that the second URL corresponds to a valid state for the document). As noted above, if such data is present in the browser cache 510, it may be used (e.g., retrieved) by the management module 260, by the browser 250, or both, to display the document in its second state (e.g., with its second appearance) on the screen 131 of the device 130.

In operation 934, the browser 250 on the device 130 displays the document in its second state, with its second appearance, and may display the second URL (e.g., http://t.d.com/y/k) which corresponds the second state, while displaying the document in its second state. According to various example embodiments, the second URL is devoid of any hash fragments (e.g., hash tags), and the second URL is displayed by the browser 250 without any hash fragment included in the second URL. The management module 260 of the device 130 may fully or partially control the browser 250 during performance of operation 934.

In operation 940, the browser 250 on the device 130 executes a user command (e.g., submitted by the user 132) to redisplay the document in its first state. For example, the browser 250 may be displaying the document in its second state (e.g., as described above with respect to operation 934), and the browser 250 may receive and execute a user command to navigate within a history of URLs that correspond to content previously displayed by the browser 250 (e.g., a "back" command). Accordingly, the management module 260 may send the request received by the web server machine 110 in operation 840. As noted above, this request may be a request for verification that the first URL corresponds to a valid state of the document.

In operation 944, the browser 250 on the device 130 displays (e.g., redisplays) the document in its first state, with its first appearance, and may display (e.g., redisplay) the first URL (e.g., http://t.d.com/x/z) which corresponds the first state, while displaying the document in its first state. As noted above, the first URL may be devoid of any hash fragments (e.g., hash tags), and the first URL may be displayed by the browser 250 without any hash fragment included in the first URL. The management module 260 of the device 130 may fully or partially control the browser 250 during performance of operation 944.

According to various example embodiments, one or more of the methodologies described herein may facilitate mapping page states to URLs. Moreover, one or more of the methodologies described herein may facilitate use of page states that are mapped to URLs, including verification of URLs, caching of data that defines page states, and display of various page states corresponding to mapped URLs. Hence, one or more the methodologies described herein may facilitate retrieval and presentation of a document having multiple states or multiple appearances without using hash fragments in URLs, as well as convenient and consistent use and sharing of humanly readable and intuitive URLs that correspond to the various states of the document.

When these effects are considered in aggregate, one or more of the methodologies described herein may obviate a need for certain efforts or resources that otherwise would be involved in retrieval and presentation of a document having multiple states or multiple appearances. Efforts expended by a user in revisiting a particular state or appearance of the document may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 10:
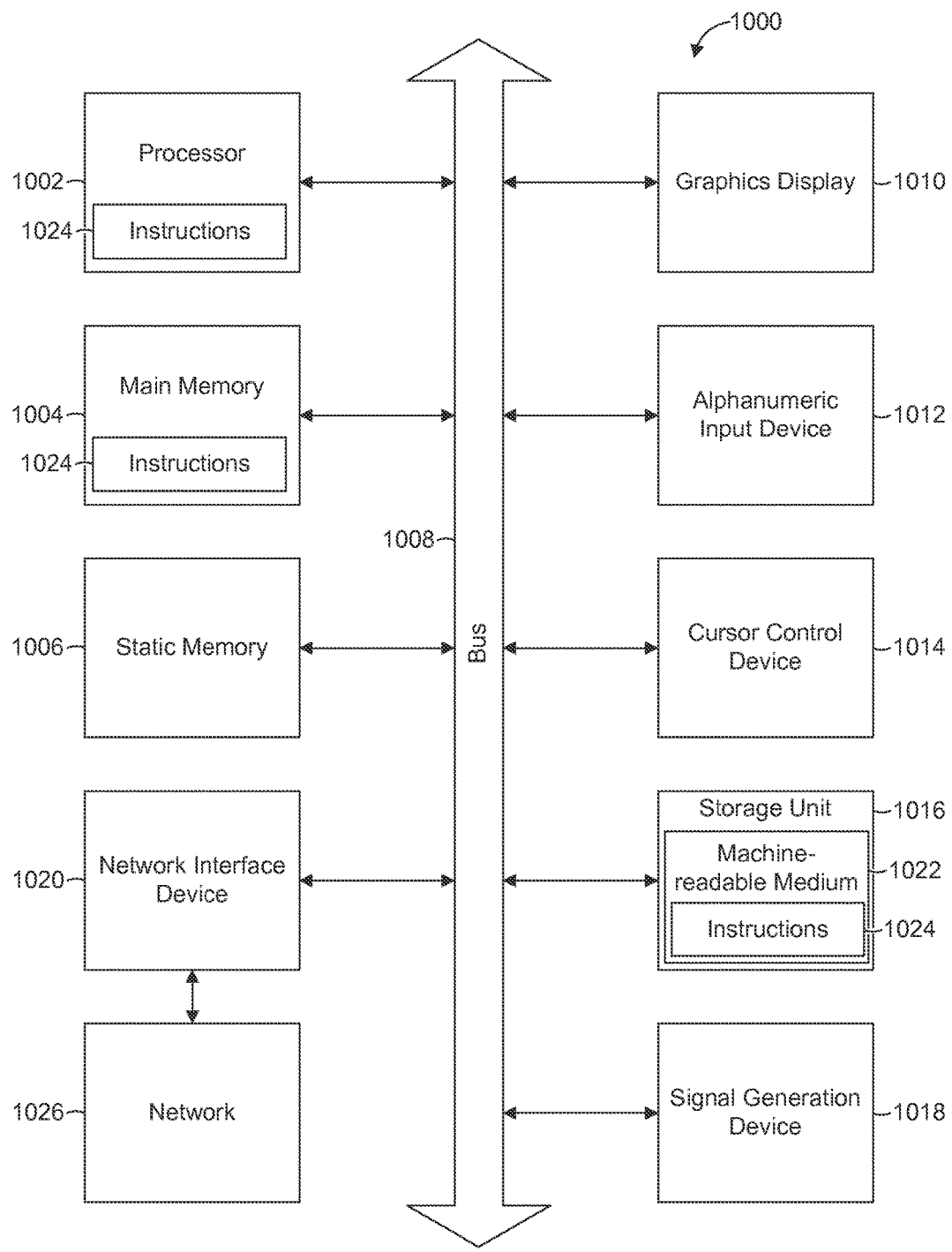
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions from a machine readable medium (e.g., a machine-readable storage medium, a computer-readable storage medium, or any suitable combination thereof) and perform any one or more of the methodologies discussed herein, in whole or in part. Specifically, FIG. 10 shows a diagrammatic representation of the machine 1000 in the example form of a computer system and within which instructions 1024 (e.g., software, a program, an application, an applet, app, or other executable code) for causing the machine 1000 to perform any one or more of the methodologies discussed herein may be executed, in whole or in part. In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include a collection of machines that individually or jointly execute the instructions 1024 to perform all or part of any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The machine 1000 may further include a graphics display 1010 (e.g., a plasma display panel (PDP), a light emitting diode (LED) display, a liquid crystal display (LCD), a projector, or a cathode ray tube (CRT)). The machine 1000 may also include an alphanumeric input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a speaker), and a network interface device 1020.

The storage unit 1016 includes a machine-readable medium 1022 on which is stored the instructions 1024 embodying any one or more of the methodologies or functions described herein. The instructions 1024 may also reside, completely or at least partially, within the main memory 1004, within the processor 1002 (e.g., within the processor's cache memory), or both, during execution thereof by the machine 1000. Accordingly, the main memory 1004 and the processor 1002 may be considered as machine-readable media. The instructions 1024 may be transmitted or received over a network 1026 (e.g., network 190) via the network interface device 1020.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1000), such that the instructions, when executed by one or more processors of the machine (e.g., processor 1002), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination, thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
   one or more hardware processors configured to:
   receive, from a client device over a computer network, a request that references a first uniform resource locator (URL) by which a single document is locatable for display in a browser running on the client device, the first URL corresponding to a first state in which the single document has a first appearance, the first appearance defined by presence of first content without second content within a portion of the single document; and
   provide, via the computer network, the single document in its first state with its first appearance to the browser in response to the request and based on the first URL corresponding to the first state, the single document in its first state including a control usable to invoke a second state in which the single document has a second appearance, the second appearance defined by presence of the second content without the first content within the portion of the single document; and
   detect, via the computer network, by the one or more hardware processors, use of the control at the client device to invoke the second state of the single document, the control referencing a second URL by which the single document is locatable for display in the browser; the browser displaying the single document in its second state with its second appearance and the second URL without requesting from a server content associated with the single document and in response to the use of the control; and
   map, by the one or more hardware processors, the second state of the single document to the second URL by storing a correspondence relationship between the second URL and data that defines the second appearance of the single document.

2. The system of claim 1: wherein the one or more hardware processors are further
   configured to provide a management module to the browser,
   the management module configuring the browser to store the correspondence relationship in a cache of the browser.

3. The system of claim 1 wherein the one or more hardware processors are further
   configured to provide a management module to the browser,
   the management module configuring the browser to request a verification that the second URL corresponds to a valid state of the single document.

4. The system of claim 1, wherein:
   the single document in its second state lacks any control usable to invoke the first state in which the single document has the first appearance; and
   the one or more hardware processors are further configured to:
   map the first state of the single document to the first URL by storing a second correspondence relationship between the first URL and second data that defines the first appearance of the single document;
   receive a further request for a verification that the first URL corresponds to a valid state of the single document, the further request being received from the browser while the browser displays the single document in its second state; and
   provide the verification that the first URL corresponds to a valid state in response to the further request and the mapping for the first state.

5. A method comprising:
   receiving by one or more hardware processors from a client device over a computer network, a request that references a first uniform resource locator (URL) by which a single document is locatable for display in a browser of the client device, the first URL corresponding to a first state in which the single document has a first appearance, the first appearance defined by presence of first content without second content within a portion of the single document;
   providing, to the client device over the computer network by the one or more hardware processors, the single document in its first state with its first appearance to the browser in response to the request and based on the first URL corresponding to the first state, the single document in its first state including a control usable to invoke a second state in which the single document has a second appearance, the second appearance defined by presence of the second content without the first content within the portion of the single document;
   detecting, by the one or more hardware processors, use of the control at the client device to invoke the second state of the single document; the control referencing a second URL by which the single document is locatable for display in the browser, the browser displaying the single document in its second state with its second appearance and the second URL without requesting from a server content associated with the single document and in response to the use of the control; and
   mapping, by the one or more hardware processors, the second state of the single document to the second URL by storing a correspondence relationship between the second URL and data that defines the second appearance of the single document.

6. The method of claim 5, wherein:
before the use of the control, the browser displays the first URL that corresponds to the first state of the single document while displaying the single document in its first state with its first appearance;
after the use of the control, the browser displays the second URL that corresponds to the second state of the single document while displaying the single document in its second state with its second appearance; and
the first and second URLs are devoid of any hash fragments and displayed by the browser without any hash fragment.

7. The method of claim 5, wherein:
after the use of the control, the browser displays the single document in its second state by retrieving data that defines the second appearance of the single document from a cache of the browser.

8. The method of claim 5, wherein:
the single document is a single-page web page that includes dynamically generated content configurable by the control; and
the control is selected from a group consisting of a link, a button, or a hotspot.

9. The method of claim 5 further comprising:
providing a verification that the first URL corresponds to the first state in which the single document has the first appearance; and
wherein the providing of the single document in its first state is based on the verifying that the first URL corresponds the first state.

10. The method of claim 5 further comprising:
providing a management module to the browser, the management module configuring the browser to store the correspondence relationship in a cache of the browser.

11. The method of claim 5 further comprising:
providing a management module to the browser, the management module configuring the browser to store the data that defines the second appearance of the single document.

12. The method of claim 5 further comprising:
providing a management module to the browser, the management module configuring the browser to request a verification that the second URL corresponds to a valid state of the single document.

13. The method of claim 12 further comprising:
receiving a further request for a verification that the second URL corresponds to a valid state of the single document, the receiving of the further request being from the browser while the browser displays the single document in its first state; and
providing the verification that the second URL corresponds to a valid state in response to the further request.

14. The method of claim 5, wherein:
the single document in its second state lacks any control usable to invoke the first state in the single document has the first appearance; and the method further comprises:
receiving a further request for a verification that the first URL corresponds to a valid state of the single document, the receiving of the further request being from the browser while the browser displays the single document in its second state; and
providing the verification that the first URL corresponds to a valid state in response to the further request.

15. The method of claim 14, wherein:
the receiving of the further request is a result of the browser executing a user command to redisplay the single document in its first state with its first appearance.

16. The method of claim 14, wherein:
the receiving of the further request is a result of the browser executing a user command to navigate within a history of URLs that correspond to content previously displayed by the browser.

17. The method of claim 16, wherein:
the user command is selected from a group consisting of a back command and a forward command,
the back command navigating backwards in the history of URLs,
the forward command navigating forwards in the history of URLs.

18. A non-transitory machine-readable storage medium comprising instructions that, when executed by one or more processors of a machine, cause the machine to perform operations comprising:
receiving by one or more hardware processors from a client device over a computer network, a request that references a first uniform resource locator (URL) by which a single document is locatable for display in a browser running on the client device, the first URL corresponding to a first state in which the single document has a first appearance, the first appearance defined by presence of first content without second content within a portion of the single document;
providing, by the one or more hardware processors, the single document in its first state with its first appearance to the browser in response to the request and based on the first URL corresponding to the first state, the single document in its first state including a control usable to invoke a second state in which the single document has a second appearance, the second appearance defined by presence of the second content without the first content within the portion of the single document;
detecting, by the one or more hardware processors, use of the control at the client device to invoke the second state of the single document, the control referencing a second URL by which the single document is locatable for display in the browser, the browser displaying the single document in its second state with its second appearance and the second URL without requesting from a server content associated with the single document and in response to the use of the control; and
mapping, by the one or more hardware processors, the second state of the single document to the second URL by storing a correspondence relationship between the second URL and data that defines the second appearance of the single document, the mapping being performed by the one or more processors of the machine.

19. The non-transitory machine-readable storage medium of claim 18, wherein the operations further comprise:
providing a management module to the browser, the management module configuring the browser to store the data that defines the second appearance of the single document.

20. The non-transitory machine-readable storage medium of claim 18, wherein:

the single document in its second state lacks any control usable to invoke the first state in which the single document has the first appearance; and the operations further comprise:
receiving a further request for a verification that the first URL corresponds to a valid state of the single document, the receiving of the further request being from the browser while the browser displays the single document in its second state; and
providing the verification that the first URL corresponds to a valid state in response to the further request.

* * * * *